US008575291B2

(12) United States Patent
Katayama et al.

(10) Patent No.: US 8,575,291 B2
(45) Date of Patent: Nov. 5, 2013

(54) THERMOPLASTIC SILICONE RESIN

(75) Inventors: Hiroyuki Katayama, Osaka (JP);
Haruka Fujii, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/461,363

(22) Filed: May 1, 2012

(65) Prior Publication Data
US 2013/0066033 A1   Mar. 14, 2013

(30) Foreign Application Priority Data

Sep. 9, 2011   (JP) ................................ 2011-197231

(51) Int. Cl.
*C08G 77/26* (2006.01)
*C08G 77/14* (2006.01)
*C08F 283/12* (2006.01)

(52) U.S. Cl.
USPC ............................. 528/28; 525/479; 525/474

(58) Field of Classification Search
USPC ..................... 528/28; 525/479, 474
See application file for complete search history.

(56) References Cited

U.S. PATENT DOCUMENTS

| 5,214,134 | A | * | 5/1993 | Weis et al. | 536/25.3 |
| 5,434,257 | A | * | 7/1995 | Matteucci et al. | 536/24.3 |
| 5,677,439 | A | * | 10/1997 | Weis et al. | 536/23.1 |
| 5,744,600 | A | * | 4/1998 | Mansuri et al. | 544/243 |
| 6,747,014 | B2 | * | 6/2004 | Teng et al. | 514/44 A |
| 7,622,131 | B2 | * | 11/2009 | Bosman et al. | 424/401 |
| 8,252,756 | B2 | * | 8/2012 | Mirkin et al. | 514/44 R |
| 2003/0176613 | A1 | | 9/2003 | Hohberg et al. | |
| 2004/0254325 | A1 | | 12/2004 | Kuepfer et al. | |

FOREIGN PATENT DOCUMENTS

| EP | 1 569 984 | | 9/2005 |
| JP | 59-120634 | | 7/1984 |
| JP | 2003-247173 | A | 9/2003 |
| JP | 2005-2340 | A | 1/2005 |
| WO | 2004/052963 | A1 | 6/2004 |

OTHER PUBLICATIONS

Partial European Search Report issued in Application No. 12165680.5 dated Aug. 24, 2012.
Carole Arnal-Herault et al., "Constitutional Self-Organization of Adenine-Uracil_Derived Hybrid Materials", Chemistry—A European Journal, vol. 13, No. 24, Aug. 17, 2007.
Nicolae Hurduc et al., "Nucleobases modified azo-polysiloxanes, materials with potential application in biomolecules nanomanipulation", Journal of Polymer Science Part A: Polymer Chemistry, vol. 45, No. 18, Sep. 15, 2007.
Ramona Enea et al., "Synthesis and photochromic behavior of some azo-polysiloxanes modified with nucleobases or donor-acceptor groups", Central European Journal of Chemistry, vol. 5, No. 4, Dec. 1, 2007.
Elena-Luize Epure et al., "Azo-polymers modified with nucleobasese and their interactions with DNA molecules", Polymer Bulletin, Springer, Berlin, DE, vol. 67, No. 3, Jan. 21, 2011.
European Search Report issued in corresponding EP application No. 1265680.5 dated Dec. 19, 2012.

* cited by examiner

*Primary Examiner* — Mike M Dollinger
(74) *Attorney, Agent, or Firm* — Sughrue Mion, PLLC

(57) ABSTRACT

A thermoplastic silicone resin has a main chain consisting of a polysiloxane and at least two side chains which branch off from the main chain. The side chain contains a functional group having two or more atomic groups each capable of forming a hydrogen bonding.

2 Claims, 1 Drawing Sheet

THERMOPLASTIC SILICONE RESIN

CROSS-REFERENCE TO RELATED APPLICATION

The present application claims priority from Japanese Patent Application No. 2011-197231 filed on Sep. 9, 2011, the contents of which are hereby incorporated by reference into this application.

BACKGROUND OF THE INVENTION

1. Field of the Invention

The present invention relates to a thermoplastic silicone resin, to be specific, to a thermoplastic silicone resin which can be widely used in various industrial products.

2. Description of Related Art

Conventionally, silicone resins have been widely used in various film forming materials, sealing materials, and electrical insulators. Many of these silicone resins are usually in a liquid state under normal temperature, so that handling and storage thereof may be difficult.

Thus, various thermoplastic silicone resins, which are solid under normal temperature and are softened by heating, have been considered.

There has been proposed, for example, a thermoplastic silicone resin composed of a block copolymer of organopolysiloxane-polyurea as the thermoplastic silicone resin (ref: for example, Japanese Unexamined Patent Publications No. 2003-247173 and No. 2005-2340).

SUMMARY OF THE INVENTION

However, the thermoplastic silicone resin described in Japanese Unexamined Patent Publications No. 2003-247173 and No. 2005-2340 turns yellow under high temperature, so that it is not suitable for industrial products requiring heat resistance and transparency.

It is an object of the present invention to provide a thermoplastic silicone resin which is capable of improving heat resistance and transparency, while having an excellent handling ability and storage stability.

A thermoplastic silicone resin of the present invention has a main chain consisting of a polysiloxane and at least two side chains which branch off from the main chain, wherein the side chain contains a functional group having two or more atomic groups each capable of forming a hydrogen bonding.

In the thermoplastic silicone resin of the present invention, it is preferable that the functional group is a nucleobase.

In the thermoplastic silicone resin of the present invention, it is preferable that the functional group is at least one selected from the group consisting of thymine, uracil, and adenine.

The thermoplastic silicone resin of the present invention has at least two side chains which branch off from the main chain consisting of the polysiloxane and the side chain contains the functional group having two or more atomic groups each capable of forming a hydrogen bonding. Therefore, two or more atomic groups form two or more hydrogen bondings to pseudo-crosslink the main chain, so that the thermoplastic silicone resin of the present invention is brought into a solid state under normal temperature and the handling ability and storage stability thereof can be improved.

In the thermoplastic silicone resin of the present invention, the main chain consists of the polysiloxane, so that discoloration and loss of transparency under high temperature can be reduced.

Accordingly, the thermoplastic silicone resin of the present invention is capable of reducing the discoloration and loss of transparency under high temperature, while capable of improving the handling ability and storage stability.

DETAILED DESCRIPTION OF THE INVENTION

Figure 1:
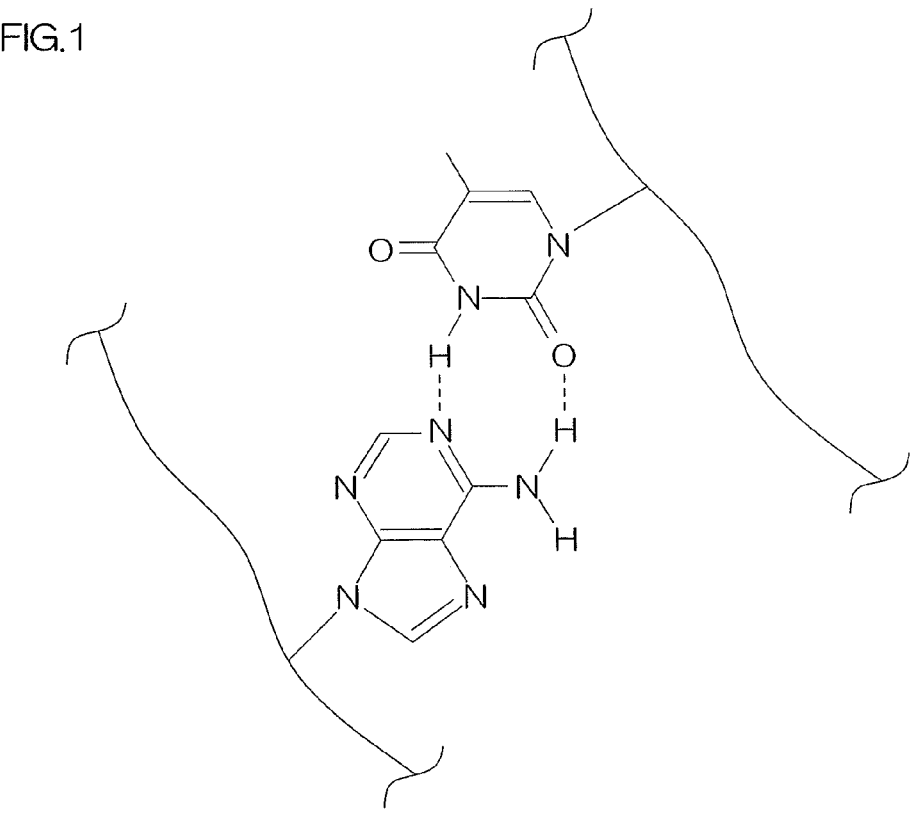
FIG. 1 shows a schematic illustration for illustrating a pseudo-crosslinking structure in a case where a thermoplastic silicone resin of the present invention contains thymine and adenine as a functional group having two or more atomic groups each capable of forming a hydrogen bonding.

A thermoplastic silicone resin of the present invention is prepared by allowing a vinyl group-containing multiple hydrogen-bondable compound to react with an organohydrogenpolysiloxane in the presence of a hydrosilylation catalyst.

To prepare the thermoplastic silicone resin of the present invention, first, the vinyl group-containing multiple hydrogen-bondable compound, the organohydrogenpolysiloxane, and the hydrosilylation catalyst are mixed to prepare a mixture.

The vinyl group-containing multiple hydrogen-bondable compound is, for example, represented by the following general formula (1).

$$MHB\text{—}Y\text{—}CH\text{=}CH_2 \hspace{2em} \text{General Formula (1)}$$

MHB in general formula (1) represents a functional group having two or more atomic groups each capable of forming a hydrogen bonding, Y represents a divalent hydrocarbon group, and —CH=CH$_2$ represents a vinyl group.

The functional group having two or more atomic groups each capable of forming a hydrogen bonding has, for example, a hydrogen donor and a hydrogen acceptor, as an atomic group capable of forming a hydrogen bonding.

The hydrogen donor is a hydrogen atom covalently bonded to an atom having a high electronegativity such as nitrogen, oxygen, and sulfur. Examples thereof include an OH group of water and alcohol, an NH group of amine and amide, and an SH group of thiol.

The hydrogen acceptor is an electrically negative atom having a lone pair of electrons. Examples thereof include an oxygen atom of water and a carbonyl group, and a nitrogen atom of a nitrogen-containing aromatic compound.

Preferably, the functional group having two or more atomic groups each capable of forming a hydrogen bonding has both the hydrogen donor and the hydrogen acceptor.

Examples of the functional group having two or more atomic groups each capable of forming a hydrogen bonding include a nucleobase such as adenine, guanine, thymine, cytosine, and uracil; diamide pyridine; diamide piperazine; ureidopyrimidinone; isocyanurate; and amide(ureido)pyrimidine.

Of the functional groups having two or more atomic groups each capable of forming a hydrogen bonding, preferably, a nucleobase such as adenine, thymine, and uracil is used.

An example of the divalent hydrocarbon group includes a straight chain, branched chain, or cyclic saturated or unsaturated hydrocarbon group.

The carbon number of the divalent hydrocarbon group is, for example, 1 to 60, in view of availability and heat resistance of the obtained thermoplastic silicone resin, preferably 1 to 50, more preferably 1 to 30, or particularly preferably 1 to 6.

Of the divalent hydrocarbon groups, preferably, methylene and phenylene are used.

To be specific, examples of the vinyl group-containing multiple hydrogen-bondable compound include 1-allylthymine (the following chemical formula (1)), 1-(4-vinylbenzyl) thymine (the following chemical formula (2)), 1-allyluracil (the following chemical formula (3)), 1-allylcytosine (the following chemical formula (4)), 9-allyladenine (the following chemical formula (5)), 9-allylguanine (the following chemical formula (6)), N-[2-(3-methylureido)pyrimidine-4-yl]-4-vinylbenzamide (the following chemical formula (7)), and 1-(6-allyl-4-oxo-1,4-dihydropyrimidine-2-yl)-3-methylurea (the following chemical formula (8)).

Of the vinyl group-containing multiple hydrogen-bondable compounds, in view of availability and economic efficiency, preferably, 1-allylthymine (the following chemical formula (1)), 1-(4-vinylbenzyl)thymine (the following chemical formula (2)), 1-allyluracil (the following chemical formula (3)), and 9-allyladenine (the following chemical formula (5)), each of which is a nucleobase having an allyl group or a styryl group, are used, or more preferably, 1-allylthymine (the following chemical formula (1)), 1-allyluracil (the following chemical formula (3)), and 9-allyladenine (the following chemical formula (5)) are used.

Chemical Formula (1):

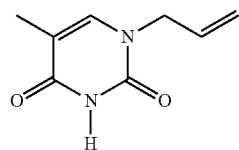

Chemical Formula (2):

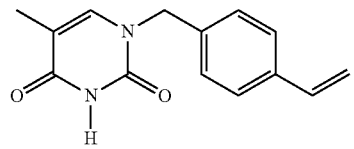

Chemical Formula (3):

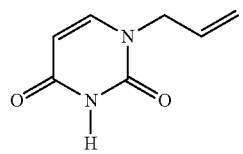

Chemical Formula (4):

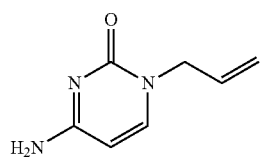

Chemical Formula (5):

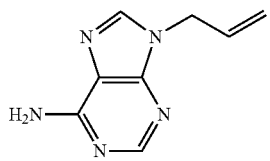

Chemical Formula (6):

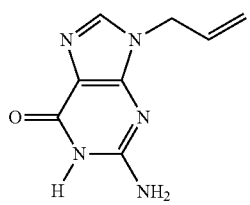

Chemical Formula (7):

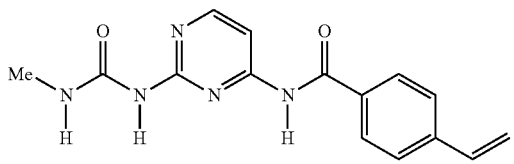

Chemical Formula (8):

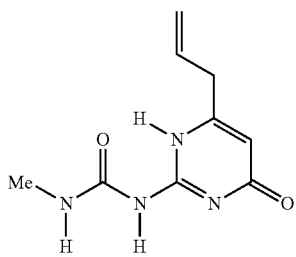

A vinyl group-containing multiple hydrogen-bondable compound synthesized in accordance with the method described in Volume 61, pages 4009 to 4014 of the "Tetrahedron Journal" published in 2005 can be used as the vinyl group-containing multiple hydrogen-bondable compound.

The mixing ratio of the vinyl group-containing multiple hydrogen-bondable compound is, for example, 1 to 99 mass %, preferably 5 to 80 mass %, or more preferably 10 to 70 mass % with respect to the total amount of the mixture.

The organohydrogenpolysiloxane is not particularly limited and in view of compatibility, preferably, is represented by the following general formula (2).

General Formula (2):

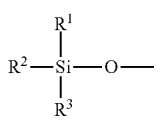

A

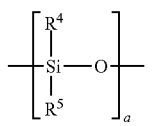

B

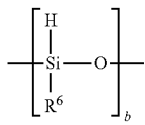

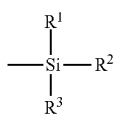

(where, in formula, A, B, C, and D represent a constituent unit, A and D represent an end unit, and B and C represent a repeating unit. $R^1$ to $R^6$ may be the same or different from each other and represent a monovalent hydrocarbon group. "a" represents an integer of 0 or 1 or more and "b" represents an integer of 2 or more.)

An example of $R^1$ to $R^6$ includes a straight chain, branched chain, or cyclic saturated or unsaturated hydrocarbon group and in view of availability and heat resistance of the obtained thermoplastic silicone resin, preferably, a methyl group is used.

The constituent units A and D represent the end units. Each of A and D is arranged at both ends of the organohydrogenpolysiloxane.

The constituent unit B represents the repeating unit. The number of repeating unit (a) is, for example, 0 to 15000, in view of stability, preferably 1 to 10000, or more preferably 5 to 1000.

The constituent unit C represents the repeating unit. The number of repeating unit (b) is, for example, 2 to 15000, in view of stability, preferably 2 to 10000, or more preferably 5 to 1000.

The sum of the number of repeating units (a+b) of the constituent unit B and the constituent unit C is, for example, 2 to 15000, preferably 2 to 10000, or more preferably 10 to 2000.

The ratio (a/b) of the number of repeating unit of the constituent unit B to that of the constituent unit C is, for example, 1500/1 to 1/1500, preferably 1000/1 to 1/1000, or more preferably 100/1 to 1/100.

The constituent unit B and the constituent unit C can be subjected to random copolymerization or block copolymerization.

The molecular weight of the organohydrogenpolysiloxane is, for example, 100 to 1500000, in view of stability and handling ability, preferably 100 to 1000000, or more preferably 100 to 100000.

The viscosity of the organohydrogenpolysiloxane is, for example, 5 to 50 mPa·s, or preferably 10 to 40 mPa·s.

To be specific, examples of the organohydrogenpolysiloxane include methylhydrogenpolysiloxane, dimethylpolysiloxane-co-methylhydrogenpolysiloxane, ethylhydrogenpolysiloxane, and methylhydrogenpolysiloxane-co-methylphenylpolysiloxane. Preferably, methylhydrogenpolysiloxane is used.

The organohydrogenpolysiloxanes can be used alone or in combination.

For example, a commercially available product (manufactured by Gelest Inc.) can be used as the organohydrogenpolysiloxane. An organohydrogenpolysiloxane synthesized in accordance with a known method can also be used.

The mixing ratio of the organohydrogenpolysiloxane is, for example, 1 to 99 mass %, preferably 5 to 80 mass %, or more preferably 10 to 70 mass % with respect to the total amount of the mixture.

The molar ratio (the vinyl group in the vinyl group-containing multiple hydrogen-bondable compound/the SiH group in the constituent unit C of the organohydrogenpolysiloxane) of the vinyl group in the vinyl group-containing multiple hydrogen-bondable compound to the SiH group in the constituent unit C of the organohydrogenpolysiloxane is, in view of being allowed to react neither too much nor too little, for example, 1/1 to 0.1/1, preferably 1/1 to 0.2/1, more preferably 1/1 to 0.5/1, or particularly preferably substantially equal in amount.

Therefore, the mixing ratio of the organohydrogenpolysiloxane and the vinyl group-containing multiple hydrogen-bondable compound is appropriately adjusted in view of the molar ratio of the SiH group in the constituent unit C to the vinyl group.

The hydrosilylation catalyst is a compound which accelerates a hydrosilylation reaction of the vinyl group in the vinyl group-containing multiple hydrogen-bondable compound and the SiH group in the organohydrogenpolysiloxane. Examples thereof include metal catalysts such as platinum catalysts such as platinum black, platinum chloride, chloroplatinic acid, a platinum olefin complex, a platinum carbonyl complex, and a platinum acetyl acetate complex; palladium catalysts; and rhodium catalysts.

Of the hydrosilylation catalysts, in view of compatibility and catalyst activity, preferably, a platinum catalyst is used, or more preferably, a platinum olefin complex such as a platinum-1,3-divinyl-1,1,3,3-tetramethyldisiloxane complex is used.

The hydrosilylation catalysts can be used alone or in combination.

The platinum concentration of the platinum complex catalyst is, for example, 0.5 to 10 mass %, or preferably 1 to 3 mass %.

When the platinum catalyst is used as the hydrosilylation catalyst, the platinum content in the mixture is, in view of reaction speed, for example, $1.0 \times 10^{-4}$ to 10 parts by mass, or preferably $1.0 \times 10^{-3}$ to 1 parts by mass with respect to 100 parts by mass of the organohydrogenpolysiloxane.

The mixing ratio of the hydrosilylation catalyst is, for example, 0.5 to 5 parts by mass, or preferably 1 to 3 parts by mass with respect to 100 parts by mass of the mixture.

The mixing method of the vinyl group-containing multiple hydrogen-bondable compound, the organohydrogenpolysiloxane, and the hydrosilylation catalyst is not particularly limited as long as they are uniformly mixed. For example, an organic solvent can be added to each of the components to be mixed as required.

Examples of the organic solvent include esters such as ethyl acetate and butyl acetate; ethers such as diethyl ether and diisopropyl ether; ketones such as acetone and methyl ethyl ketone; and halogenated hydrocarbons such as dichloromethane, dichloroethane, and carbon tetrachloride.

Of the organic solvents, in view of compatibility, preferably, the halogenated hydrocarbons are used.

The additive amount of the organic solvent is, for example, 0.1 to 1000 parts by mass, or preferably 1 to 500 parts by mass with respect to 100 parts by mass of the mixture.

Next, the obtained mixture is stirred and heated as required.

By stirring and heating, the vinyl group in the vinyl group-containing multiple hydrogen-bondable compound is bonded to the SiH group in the constituent unit C of the organohydrogenpolysiloxane by the hydrosilylation reaction, so that the thermoplastic silicone resin is prepared.

Reaction conditions are as follows: a reaction temperature of, for example, 0 to 200° C., or preferably 20 to 150° C. and a reaction duration of, for example, 0.5 to 96 hours, or preferably 10 to 30 hours.

The degree of progress of the hydrosilylation reaction can be checked by $^1$H-NMR measurement based on the intensity of a signal derived from the vinyl group in the vinyl group-containing multiple hydrogen-bondable compound. The reaction is considered to be terminated at the time of disappearance of the signal.

As described above, the mixture of the vinyl group-containing multiple hydrogen-bondable compound, the organohydrogenpolysiloxane, and the hydrosilylation catalyst is stirred and heated, so that the thermoplastic silicone resin is prepared.

A known additive can be added to the prepared thermoplastic silicone resin at an appropriate ratio in addition to the above-described components. Examples of the additive include reinforcing agents, antioxidants, modifiers, surfactants, dyes, pigments, discoloration inhibitors, and ultraviolet absorbers.

The thermoplastic silicone resin has a main chain consisting of the polysiloxane derived from the organohydrogenpolysiloxane and at least two side chains, which branch off from the main chain, derived from the vinyl group-containing multiple hydrogen-bondable compound.

The side chain contains the functional group having two or more atomic groups each capable of forming a hydrogen bonding.

Therefore, in the thermoplastic silicone resin of the present invention, the atomic groups form multiple hydrogen bondings to pseudo-crosslink the main chain.

For example, FIG. 1 shows the multiple hydrogen bondings which are formed in a case where the thermoplastic silicone resin of the present invention contains thymine and adenine as a functional group having two or more atomic groups each capable of forming a hydrogen bonding.

The thymine has, as an atomic group capable of forming a hydrogen bonding, a hydrogen atom bonded to a nitrogen atom, which is a hydrogen donor, and an oxygen atom of a carbonyl group, which is a hydrogen acceptor.

The adenine has, as an atomic group capable of forming a hydrogen bonding, a hydrogen atom of an amino group, which is a hydrogen donor, and a nitrogen atom of an aromatic ring, which is a hydrogen acceptor.

When the thymine and the adenine are close to each other, the hydrogen donor of the thymine and the hydrogen acceptor of the adenine, and the hydrogen acceptor of the thymine and the hydrogen donor of the adenine are respectively hydrogen bonded to form double hydrogen bondings. Therefore, the main chain of the thermoplastic silicone resin is pseudo-crosslinked by the double hydrogen bondings.

Figure 2:
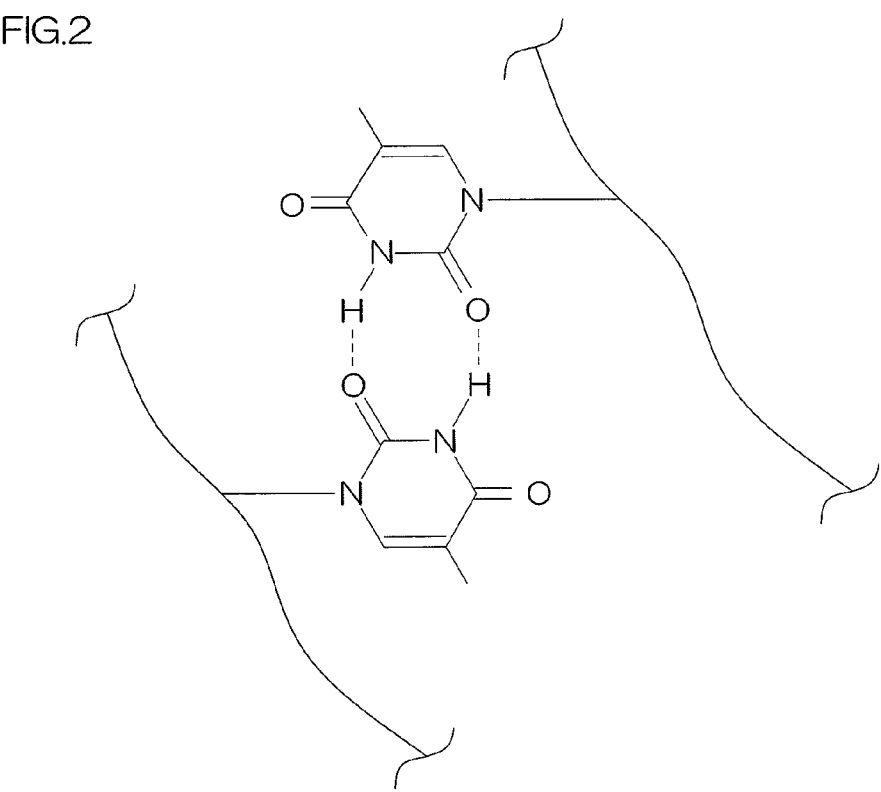
FIG. 2 shows a schematic illustration for illustrating a pseudo-crosslinking structure in a case where a thermoplastic silicone resin of the present invention contains two thymines as a functional group having two or more atomic groups each capable of forming a hydrogen bonding.

FIG. 2 shows the multiple hydrogen bondings which are formed in a case where the thermoplastic silicone resin of the present invention contains two thymines as a functional group having two or more atomic groups each capable of forming a hydrogen bonding.

In this case, when the thymines are close to each other, the hydrogen donor of one thymine and the hydrogen acceptor of the other thymine, and the hydrogen acceptor of one thymine and the hydrogen donor of the other thymine are respectively hydrogen bonded to form double hydrogen bondings. Therefore, the main chain of the thermoplastic silicone resin is pseudo-crosslinked by the double hydrogen bondings.

The bonding energy of the multiple hydrogen bondings is generally much less than that of a covalent bonding, but is larger than that of a single hydrogen bonding.

As a result, the thermoplastic silicone resin of the present invention is brought into a solid state under normal temperature because its main chain is pseudo-crosslinked by the multiple hydrogen bondings. When the thermoplastic silicone resin of the present invention is heated, the hydrogen bondings are dissociated to be brought into a gel-like state or a liquid state to show thermoplastic behavior. Then, when the thermoplastic silicone resin of the present invention is again cooled down, multiple hydrogen bondings are formed and the resin is brought back into a solid state. That is, the thermoplastic behavior of the thermoplastic silicone resin of the present invention is reversible. In the present application, "normal temperature" means 15 to 35° C.

The softening point of the thermoplastic silicone resin is, for example, 40 to 150° C., or preferably 45 to 100° C.

Therefore, the handling ability and storage stability of the thermoplastic silicone resin can be improved.

In the thermoplastic silicone resin of the present invention, the main chain consists of the polysiloxane, so that discoloration and loss of transparency under high temperature can be reduced.

Accordingly, the thermoplastic silicone resin of the present invention is capable of reducing the discoloration and loss of transparency under high temperature, while capable of improving the handling ability and storage stability.

The thermoplastic silicone resin of the present invention has an excellent heat resistance and thus is used in various applications such as insulating film forming materials, weather resistant coating materials, insulating molding materials, semiconductor sealing materials (semiconductor encapsulating materials), and additives of silicone resins.

EXAMPLES

While the present invention will be described hereinafter in further detail with reference to Examples and Comparative Examples, the present invention is not limited to these Examples and Comparative Examples.

Example 1

0.050 g (0.30 mmol) of 1-allylthymine and 0.042 g (the molar ratio of vinyl group in 1-allylthymine to SiH group in organohydrogenpolysiloxane is 1/1) of an organohydrogenpolysiloxane (a compound in which all of the $R^1$s to $R^6$s are methyl groups and represented by "a"=10 and "b"=11 in the above-described general formula (2), the viscosity of 20 mPa·s) were dissolved in 1 mL of dichloroethane and 2 μL (the platinum content is 0.1 parts by mass with respect to 100 parts by mass of the organohydrogenpolysiloxane) of a platinum-1,3-divinyl-1,1,3,3-tetramethyldisiloxane complex (a platinum concentration of 2 mass %) as a hydrosilylation catalyst was added thereto to be stirred at 70° C. for 20 hours. Thereafter, under reduced pressure, the solvent was removed at room temperature (25° C.), so that a thermoplastic silicone resin was obtained.

Example 2

A thermoplastic silicone resin was obtained in the same manner as in Example 1, except that 0.074 g (the molar ratio of vinyl group in 1-allylthymine to SiH group in organohydrogenpolysiloxane is 1/1) of an organohydrogenpolysiloxane (a compound in which all of the $R^1$s to $R^6$s are methyl groups and represented by "a"=20 and "b"=9 in the above-described general formula (2), the viscosity of 30 mPa·s) was used instead of the organohydrogenpolysiloxane in Example 1.

Example 3

A thermoplastic silicone resin was obtained in the same manner as in Example 1, except that 0.074 g (0.30 mmol) of 1-(4-vinylbenzyl)thymine was used instead of the 1-allylthymine.

Example 4

A thermoplastic silicone resin was obtained in the same manner as in Example 1, except that 0.046 g (0.30 mmol) of 1-allyluracil was used instead of the 1-allylthymine.

Example 5

A thermoplastic silicone resin was obtained in the same manner as in Example 1, except that 0.053 g (0.30 mmol) of 9-allyladenine was used instead of the 1-allylthymine.

Comparative Example 1

2.44 g of aminopropyl-terminated polydimethylsiloxane represented by the following chemical formula (9), 0.50 g (2.9 mmol) of tolylene-2,4-diisocyanate, and 6 mL of methyl ethyl ketone were stirred and mixed under a nitrogen atmosphere at room temperature (25° C.) for 1 hour. Thereafter, under reduced pressure, the solvent was removed at room temperature (25° C.), so that a thermoplastic silicone resin was obtained.

Chemical Formula (9):

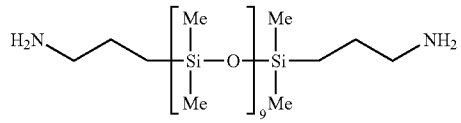

Comparative Example 2

0.10 g (1.7 mmol) of an allyl alcohol and 0.24 g (the molar ratio of vinyl group in allyl alcohol to SiH group in organohydrogenpolysiloxane is 1/1) of an organohydrogenpolysiloxane (a compound in which all of the $R^1$s to $R^6$s are methyl groups and represented by "a"=10 and "b"=11 in the above-described general formula (2), the viscosity of 20 mPa·s) were dissolved in 3 mL of dichloroethane and 6 μL (the platinum content is 0.1 parts by mass with respect to 100 parts by mass of the organohydrogenpolysiloxane) of a platinum-1,3-divinyl-1,1,3,3-tetramethyldisiloxane complex (a platinum concentration of 2 mass %) as a hydrosilylation catalyst was added thereto to be stirred at 70° C. for 20 hours. Thereafter, under reduced pressure, the solvent was removed at room temperature (25° C.), so that a thermoplastic silicone resin was obtained.

Test Example 1

Thermoplasticity

Each of the thermoplastic silicone resins obtained in Examples and Comparative Example (except for Comparative Example 2) was heated at 30 to 100° C. using a hot plate to visually check the temperature at which a resin in a solid state is completely brought into a liquid state. The results are shown in Table 1.

Test Example 2

Heat Resistance

Each of the thermoplastic silicone resins obtained in Examples and Comparative Examples was statically put in a hot air dryer at 200° C. to visually observe the color change after the elapse of 24 hours. The resulting resins were classified as follow. A: Color was not changed after heating. B: Color was changed into yellow. C: Color was changed into brown. The results are shown in Table 1.

TABLE 1

|  |  | Example 1 | Example 2 | Example 3 | Example 4 |
|---|---|---|---|---|---|
| Silicone Resin | (1) Vinyl Group-Containing Multiple Hydrogen-Bondable Compound | 1-Allylthymine | 1-Allylthymine | 1-(4-Vinylbenzyl)thymine | 1-Allyluracil |
|  | (2) Organohydrogen-polysiloxane | Compound in Which All of $R^1$s to $R^6$s are Methyl Groups and Represented by "a" = 10 and "b" = 11 in General Formula (2) | Compound in Which All of $R^1$s to $R^6$s are Methyl Groups and Represented by "a" = 20 and "b" = 9 in General Formula (2) | Compound in Which All of $R^1$s to $R^6$s are Methyl Groups and Represented by "a" = 10 and "b" = 11 in General Formula (2) | Compound in Which All of $R^1$s to $R^6$s are Methyl Groups and Represented by "a" = 10 and "b" = 11 in General Formula (2) |
| Properties | Appearance at 25° C. | White Solid | White Solid | White Solid | White Solid |
|  | Liquefaction Temperature | 60° C. | 55° C. | 65° C. | 60° C. |
|  | Heat Resistance | A | A | B | A |

TABLE 1-continued

|  |  | Example 5 | Comparative Example 1 | Comparative Example 2 |
|---|---|---|---|---|
| Silicone Resin | (1) Vinyl Group-Containing Multiple Hydrogen-Bondable Compound | 9-Allyladenine | Organopolysiloxane/ Polyurea | Polysiloxane Containing Hydrosilyl Group in Side Chain |
|  | (2) Organohydrogen-polysiloxane | Compound in Which All of $R^1$s to $R^6$s are Methyl Groups and Represented by "a" = 10 and "b" = 11 in General Formula (2) |  |  |
| Properties | Appearance at 25° C. | White Solid | Slightly Yellow Solid | Colorless Liquid |
|  | Liquefaction Temperature | 60° C. | 80° C. |  |
|  | Heat Resistance | A | C | A |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A thermoplastic silicone resin comprising:
a main chain consisting of a polysiloxane and at least two side chains which branch off from the main chain,
wherein the side chain contains a functional group that is at least one selected from the group consisting of thymine, uracil, and adenine, and
wherein the thermoplastic silicone resin is obtained by allowing a vinyl group of a vinyl group-containing multiple hydrogen bondable compound to react with a hydrogen atom directly bonded to a Si atom of an organohydrogenpolysiloxane, and
the vinyl group-containing multiple hydrogen bondable compound is represented by general formula (1) below:

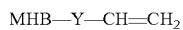   general formula (1)

where MHB represents a functional group that is at least one selected from the group consisting of thymine, uracil, and adenine, Y represents a methylene group or a phenylene group, and —CH=CH$_2$ represents a vinyl group, and the organohydrogenpolysiloxane is represented by general formula (2) below:

general formula (2)

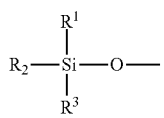  A

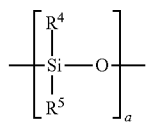  B

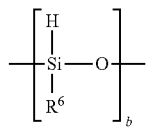  C

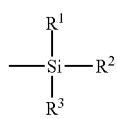  D

Where A, B, C, and D represent a constituent unit, A and D represent an end unit, and B and C represent a repeating unit; $R^1$ to $R^6$ may be the same or different from each other and represent a monovalent hydrocarbon group; and "a" represents an integer of 0 or more, and "b" represents an integer of 2 or more.

2. The thermoplastic silicone resin according to claim 1, wherein the functional group is a nucleobase.

* * * * *